Patented May 6, 1924.

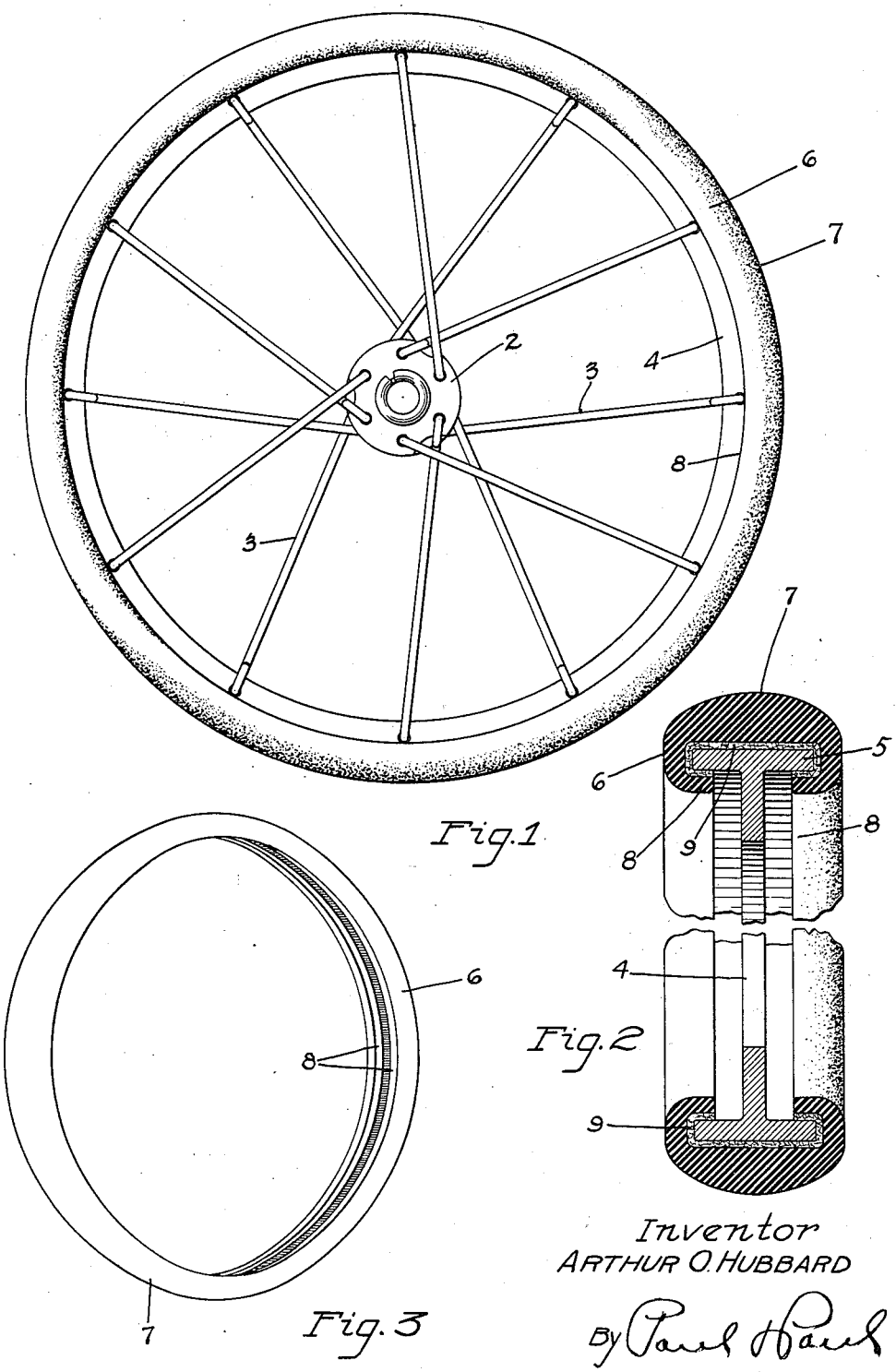

1,492,849

UNITED STATES PATENT OFFICE.

ARTHUR O. HUBBARD, OF MINNEAPOLIS, MINNESOTA.

WHEEL TIRE.

Application filed November 4, 1921. Serial No. 512,818.

*To all whom it may concern:*

Be it known that I, ARTHUR O. HUBBARD, a citizen of the United States, resident of Minneapolis, county of Hennepin, State of Minnesota, have invented certain new and useful Improvements in Wheel Tires, of which the following is a specification.

The object of my invention is to provide a tire designed particularly for the wheel of a child's wagon, though capable of other uses.

A further object is to provide a tire capable of convenient application to the rim of a wheel and one which will be very durable, requiring practically no attention while in use.

In the accompanying drawings forming part of this specification,

Figure 1 is an elevation of a wheel with my invention applied thereto,

Figure 2 is a sectional view, showing the manner of mounting the tire on the rim, Figure 3 is a perspective view of the tire, removed from the wheel.

In the drawing, 2 represents the hub of the wheel, 3 spokes connected thereto and to an annular flange 4 of the T-rim 5. 6 is a tire of suitable yielding material having a tread portion 7 and lips 8 adapted to embrace the edges of the T-rim and firmly gripping the same, hold the tire in place thereon. A suitable lining 9, preferably of rubberized fabric, is preferably inserted between the tire and the rim of the wheel. The tire is so molded that the annular recess therein conforms substantially in shape to the rim so that when the tire is stretched and in place thereon, it will fit the surface of the rim snugly and gripping the edges thereof, will be held firmly against accidental slippage and separation from the wheel. Should the tire become worn or damaged, it can be removed by the insertion of a suitable tool, such as a screw driver, between one of the lips and the rim of the wheel and then forcing the tire lip outwardly until it becomes disengaged from the adjacent edge of the rim.

I claim as my invention:

In combination with a wheel rim T-shaped substantially in cross section, a tire of yielding material having a tread portion adapted to be seated on the periphery of the rim and inwardly turned annular lip portions forming recesses to receive the peripheral edges of the rim, said tire being stretched to receive the rim and when in place thereon being held by the tension of said yielding material.

In witness whereof, I have hereunto set my hand this 31st day of October, 1921.

ARTHUR O. HUBBARD.